US008716468B2

(12) United States Patent
Bogaert

(10) Patent No.: US 8,716,468 B2
(45) Date of Patent: May 6, 2014

(54) PROCESS FOR PREPARING RANDOMLY-BONDED POLYSACCHARIDES

(75) Inventor: Piet Bogaert, Aalst (BE)

(73) Assignee: Syra, Belgium N.V., Aalst (BE)

( * ) Notice: Subject to any disclaimer, the term of this patent is extended or adjusted under 35 U.S.C. 154(b) by 785 days.

(21) Appl. No.: 12/308,433

(22) PCT Filed: Jun. 15, 2006

(86) PCT No.: PCT/EP2006/063261
§ 371 (c)(1),
(2), (4) Date: Feb. 17, 2009

(87) PCT Pub. No.: WO2007/144025
PCT Pub. Date: Dec. 21, 2007

(65) Prior Publication Data
US 2010/0240884 A1 Sep. 23, 2010

(51) Int. Cl.
*C08B 37/00* (2006.01)
*A23L 1/308* (2006.01)

(52) U.S. Cl.
CPC ........... *A23L 1/3088* (2013.01); *C08B 37/0009* (2013.01)
USPC ...................................................... 536/123.1

(58) Field of Classification Search
CPC ........................... A23L 1/3008; C08B 37/0009
USPC ...................................................... 536/123.1
See application file for complete search history.

(56) References Cited

U.S. PATENT DOCUMENTS

| | | | | |
|---|---|---|---|---|
| 2,719,179 A | * | 9/1955 | Mora et al. | 536/123 |
| 3,766,165 A | * | 10/1973 | Rennhard | 536/123.1 |
| 3,880,407 A | * | 4/1975 | List | 366/99 |
| 5,558,899 A | * | 9/1996 | Kuzee et al. | 426/658 |
| 6,362,266 B1 | * | 3/2002 | Buchholz et al. | 524/318 |
| 2005/0024987 A1 | * | 2/2005 | Kunz et al. | 366/97 |

FOREIGN PATENT DOCUMENTS

| | | | | |
|---|---|---|---|---|
| FR | 2 266 742 | | 10/1975 | |
| KR | 180955 | | 11/1995 | |
| KR | 0154258 | * | 10/1998 | C08B 37/00 |
| WO | WO 03/035235 | | 5/2003 | |
| WO | WO2005099473 A1 | * | 10/2005 | A23G 3/00 |

OTHER PUBLICATIONS

Hwang, J.-K. et al., Starch/Starke, "Production of Glucooligosaccharides and Polydextrose by Extrusion Reactor", 1998, vol. 50, nr. 2-3, p. S104-S107.*

* cited by examiner

*Primary Examiner* — Wu-Cheng Winston Shen
*Assistant Examiner* — Yih-Horng Shiao
(74) *Attorney, Agent, or Firm* — James Creighton Wray

(57) ABSTRACT

The invention relates to a process for preparing a randomly-bonded polysaccharide, comprising as ingredients a saccharide, a polyol and an acid serving as a catalyst, the process comprising the steps of feeding the ingredients into a reactor in order to dehydrate the fed ingredients to an essentially anhydrous syrup, polycondensating the essentially anhydrous syrup at elevated temperatures in the said reactor while removing the reaction water, wherein the reactor is a mixing kneader device with counter-acting blades, wherein during the feeding step the saccharide, the polyol and the acid serving as catalyst are simultaneously or consecutively fed to the reactor, and in that during the dehydratation and polycondensation step the free water and reaction water is removed from the mixing kneader device by kneading and mixing the fed ingredients and the subsequent essentially anhydrous syrup under reduced pressure in the reactor, and during the polycondensation the essentially anhydrous syrup is continuously kneaded in the kneader reactor until the required degree of polymerization is obtained.

22 Claims, No Drawings

PROCESS FOR PREPARING RANDOMLY-BONDED POLYSACCHARIDES

This application claims the benefit of PCT/EP2006/063261 filed Jun. 15, 2006, which is hereby incorporated by reference in its entirety.

This invention relates to a process for preparing a randomly-bonded polysaccharide, comprising as ingredients a saccharide, a polyol and an acid serving as a catalyst, the process comprising the steps of feeding the ingredients into a reactor in order to dehydrate the fed ingredients to an essentially anhydrous syrup, polycondensating the essentially anhydrous syrup at elevated temperatures in the said reactor while removing the reaction (polycondensation) water.

In U.S. Pat. No. 3,766,165, a process is described for preparing polysaccharides which comprises melting a dry saccharide selected from the group consisting of d-glucose and maltose at a temperature below the point of substantial decomposition of said saccharide, maintaining said molten saccharide at about 140 to 295° C. and at reduced pressure in the presence of a catalytic amount of up to 10 mol percent of a food-acceptable polycarboxylic acid catalyst and in the substantial absence of water until substantial polymerization occurs, and simultaneously removing the water formed during said melting and polymerization. For instance, in example II, a recipe for a dietetic food is described wherein a pre-blend of dextrose monohydrate, sorbitol powder and tartaric acid is melted in a steam jacket screw conveyor. This melt is continuously fed to a vacuum-operated continuous double-arm mixer, (Baker-Perkins multipurpose continuous mixer) and heated to 165° C.-245° C. at a pressure of 75-100 mm Hg at a controlled feed rate.

As mentioned in GB 1 422 294, it is well known that precise blending and transfer of solids, as also is the case in U.S. Pat. No. 3,766,155, is more difficult and expensive in commercial practice than is the case with liquids or solutions which have the advantage of being readily transferable by mechanical pumps and metered precisely by common volumetric measuring devices. In commercial practice, polysaccharides such as polyglucose and polymaltose products are most efficiently prepared by a continuous process. However, the prior melt polymerization process requires continuous mixing and blending of the correct amounts of solid reactants which must then be heated to a temperature in the range of about 110° C. to 150° C. to melt the reaction mixture. The molten feed must be held at this temperature until it is introduced into the polycondensation reactor. During the holding period, objectionable colour formation takes place and related oxidative decomposition products tend to form if the reactants are held in contact with the atmosphere.

A solution to the above shortcomings is proposed by this GB 1 422 294, wherein a process is disclosed for preparing polysaccharides and polysaccharide derivates, useful as dietetic food ingredient, which comprises combining in aqueous solution glucose, maltose or a mixture thereof, together with up to 10% mole based on total sugar of a food-acceptable polycarboxylic acid catalyst and optionally, from 5 to 20%, based on the weight of total reactants, of food-acceptable polyol selected from sorbitol, glycerol, erythritol xylitol, mannitol and galactitol, dehydrating the said solution at below atmospheric pressure to an essentially anhydrous syrup at below atmospheric pressure at a temperature of from 150° C. to 300° C. until polycondensation occurs while evaporating the water formed during the said polycondensation, and halting the said polycondensation before pyrolysis occurs in an appreciable amount. The saccharide, the acid catalyst and if desired, the polyol are combined in an aqueous feed stock solution, which is then concentrated to an essentially anhydrous syrup by means of a separate evaporator of the wiped thin-film type or a flash evaporator, whereafter the syrup is quickly transferred to a polycondensation reactor operating at reduced pressure and at a temperature of 150-300° C., for instance as mentioned in example 1 a vacuum operated continuous double-arm mixer operating at a pressure of 75-100 mm Hg and a temperature as measured at various zones in the unit ranged from 115° C. to 245° C. Alternatively, the evaporation of the fed ingredients stock aqueous solution can be effected in the initial section of a flow-through reactor designed to handle highly viscous materials; the subsequent sections of the reactor, adjusted within the specified temperature range, may be used to carry out the polycondensation, thus accomplishing both operations in one reactor. As a result of the process as described in GB 1 442 294, the anhydrous feed material is less coloured and contains less by-products before polycondensation than when an anhydrous feed is prepared by the fusion method (using the steam jacket screw conveyor) as described in U.S. Pat. No. 3,766,155.

An alternative approach to the process as described in U.S. Pat. No. 3,766,155, is described in U.S. Pat. No. 5,051,500, wherein a continuous method is described of preparing a randomly-bonded polysaccharide comprising the steps of:

feeding ingredients comprising a reducing saccharide and an edible carboxylic acid, each as a separate stream in solid particulate form, into a vented chamber having means for conveying said ingredients longitudinally through said chamber with lateral mixing of said ingredients and minimal longitudinal mixing of said ingredients;

melting and laterally mixing said ingredients in a first zone of said chamber to form a melt;

conveying said melt within said chamber by said means for conveying to a second zone of said chamber;

reacting said melt in said second zone of said chamber under reduced pressure and agitation to form a randomly-bonded polysaccharide in said melt;

conveying said melt through said second zone by said conveying means;

subjecting said melt while in said second zone to reduced pressure and agitating said melt to remove water from said melt.

An example of an apparatus to be used in the process according to U.S. Pat. No. 5,051,500 is an extruder having co-rotating screws which provide minimal longitudinal mixing, but excellent lateral mixing, and thereby promote both product homogeneity (i.e. reduced polydispersity) and reaction rate, the latter by facilitating the removal of water of condensation.

A further alternative process to the method as described in U.S. Pat. No. 3,766,155, is disclosed in EP 404 227. The problem which forms the basis of EP 404 227 is that one of the embodiments of process as disclosed in U.S. Pat. No. 3,766,165 is to apply a continuous polymerization in the temperature range of 200-300° C. under vacuum for a period of about 10 minutes. However, maintaining the vacuum required in the known process demands extra measures such as the use of peripheral equipment, which is regarded as an inherent disadvantage of the process as disclosed in U.S. Pat. No. 3,766,165. Therefore, in EP 404 227, an attempt was made to develop a process which can be carried out continuously and with which the desired polysaccharide product can be obtained both in a very short time and without the use of the equipment required to maintain the vacuum conditions. This was achieved by providing a process for the preparation of polysaccharide derivatives by reacting at least a saccharide, a polyol and a food-grade polycarboxylic acid, which also acts as catalyst, at elevated temperature, wherein the reactants are fed in the form of a mixture through a worm shaft reactor operating at elevated temperature and under elevated pressure, a reaction product being obtained at a temperature of 140° C.-300° C.

However, the above cited methods still offer a number of disadvantages, mainly related to the polycondensation reaction. During the polycondensation reaction, water is insufficiently removed in the reaction environments of the prior art, leading to reduced reaction efficiency and too high concentrations of degree of polymerisation (DP) 1 and DP2 material. This has been compensated in the above cited prior art by increasing the residence time and/or the reaction temperature. As a result, increased colour formation and by-product formation lead to poor product quality, and increased refining costs in order to provide an acceptable product for the market.

The purpose of the invention is consequently to provide an improved process for preparing a randomly-bonded polysaccharide according to the preamble of claim 1, resulting in improved evacuation of reaction water, in combination with milder reaction conditions, compared to state of the art processes.

This purpose of the invention is solved by providing a process for preparing a randomly-bonded polysaccharide, comprising as ingredients a saccharide, a polyol and an acid serving as a catalyst, the process comprising the steps of feeding the ingredients into a reactor in order to dehydrate the fed ingredients to an essentially anhydrous syrup, polycondensating the essentially anhydrous syrup at elevated temperatures in the said reactor while removing the reaction water, wherein the reactor is a mixing kneader device with counter-acting blades, and wherein during the feeding step the saccharide, the polyol and the acid serving as catalyst are simultaneously or consecutively fed to the reactor, and in that during the dehydratation and polycondensation step the free (solution and crystal) water and reaction water is removed from the mixing kneader device by kneading and mixing the fed ingredients and the subsequent essentially anhydrous syrup under reduced pressure in the reactor, and during the polycondensation the essentially anhydrous syrup is continuously kneaded in the kneader reactor until the required degree of polymerisation is obtained.

The required degree of polymerisation is described in the Official Journal of the European Communities about food additives, no. E1200 (polydextrose).

As a result of the process of the invention, randomly bonded polysaccharides are obtained showing a higher mean average molecular weight, lower contents of DP1 and/or DP2, and a higher content of poly-condensates having a DP>3, compared to prior art products obtained by processes using about the same energy input. At the same time, the formation of colour bodies during manufacturing is limited, while thermal and chemical stability is improved due to the reduced quantity of residual reducing sugars, compared to the standard quality products which are actually commercialised in the market (e.g. StaLite III or Litesse II).

Concerning mixing devices, in U.S. Pat. No. 3,880,407, EP 517 068 and EP 528 210 and WO 03/035235 mixing kneaders are described for carrying out mechanical, chemical and/or thermal processes.

The mixing kneading device as disclosed in U.S. Pat. No. 3,880,407 uses counter-acting blades for the mechanical, chemical and thermal treatment of liquid, pasty and powdery products, with or without the input or output of gases or vapours, so that a satisfactory exchange of material is achieved in all phases. The device provides a satisfactory kneading effect, even when the materials being processed are in the paste state.

In EP 517 068, a mixing kneader is disclosed, containing two rotating shafts containing specially arranged kneading bars, showing improved self-cleaning properties, increased specific heat exchange surface, more active surface renewal during diffusion-controlled evaporation processes, and a more intense mixing during kneading, including reduced compacting.

The mixing kneader of EP 528 210 provides a large free usable volume and excellent self-cleaning properties. Such types of reactors are particularly useful for processing high viscosity fluids and cohesive loose materials in the chemical engineering field.

In WO 03/035235, improvements are described with regard to the mixer kneaders of EP 517 068. This application further refers to the use of such mixing kneaders as reactors for polycondensations and polymerisations. These mixing kneaders are clearly different from the double arm mixers mentioned in U.S. Pat. No. 3,766,155.

Apart from the mixing kneader devices as described in the abovementioned patent applications, also other mixer kneaders exist showing the same characteristics as the above cited reactors, in particular with regard to the fast renewal of the product surface resulting in an improved evacuation of volatile compounds.

In a preferred embodiment of a process according to the invention, the mixing kneader device is heated between 160° C. and 220° C., more preferably between 175° C. and 200° C., and most preferably between 175° C. and 190° C.

In a favourable process according to the invention, the reduced pressure in the mixing kneader device varies between 50 and 400 hPa, more preferably between 100 and 300 hPa.

Under these conditions, during the dehydration step the solution water and in the polycondensation step the reaction water is continuously removed.

In an advantageous process according to the invention, the mixing kneader device is filled up to a filling level of between 40 and 90%, more preferably between 75 and 85%.

The filling level, in combination with the reduced pressure (vacuum) used, will prevent excessive foaming. At the same time, the positioning of the mixing elements in the mixing kneader device provides a fast renewal of the product surface resulting in an improved evacuation of the reaction water during polycondensation.

The ingredients, i.e. the saccharide, the polyol and the acid serving as a catalyst can be fed directly simultaneously or consecutively to the reactor. This means that, on the one hand the ingredients can be added as three different product streams at the same time into the reactor, or on the other hand can be added into the reactor as three different product streams the one after the other. In order to homogenise the ingredients as quick as possible in the reactor, an amount of water can be added.

On the other hand, the ingredients can be fed to the reactor as a pre-blend.

Depending on the moisture content and the temperature at which the pre-blend is prepared, a liquid or pasty mixture is obtained.

In a preferred embodiment of a process according to the invention, the total moisture content of the fed ingredients in the reactor is between 10 and 30 w/w %, more preferably between 11 and 20 w/w %.

In an advantageous process according to the invention, the polyol is a sorbitol. The sorbitol is preferably selected among crystalline sorbitol, crystallising sorbitol syrup or non-crystallising sorbitol syrup. Most preferably, the sorbitol is a crystallising-type sorbitol syrup.

In a favourable process according to the invention, the saccharide is a glucose. Preferably, the glucose is selected among crystalline dextrose monohydrate, anhydrous dextrose, D99 dextrose syrup, or D96 glucose syrup. Most preferably, the glucose is a crystalline dextrose monohydrate.

The acid serving as a catalyst can be an organic acid, preferably it can be citric acid, tartaric acid, succinic acid and/or fumaric acid. Otherwise, the acid serving as a catalyst can also be an inorganic acid, preferably phosphoric acid. For using the randomly-bonded polysaccharides in food-applications, the acids used are food grade.

Depending of the type of reactor used, the process according to the invention can be performed continuously or in batch.

In the following examples the process of the invention will be illustrated using continuous as well as batch mixer kneader reactors.

EXAMPLES 1-3

The first series of examples has been performed on a DTB6,5 batch mixing kneader from LIST AG. The ingredients were directly fed into the DTB6,5 batch reactor. The following ingredient addition sequence was applied:
- addition of aqueous sorbitol (30 w/w % water);
- addition of catalyst (acid);
- addition of crystalline dextrose monohydrate (9 w/w % water) In the dehydration step, the mixture is heated under reduced pressure (vacuum) of 200 hPa to a temperature of 140° C. whereby the solution and crystal (free) water is removed. During the polycondensation step, the temperature of the mixing kneader device is then further increased to the values mentioned in table 1, which describes the reaction parameters for examples 1 to 3.

TABLE 1

Reaction parameters

|  | Example 1 | Example 2 | Example 3 |
|---|---|---|---|
| Dextrose monohydrate | 5.2 kg | 4.8 kg | 4.8 kg |
| Sorbitol syrup (70 w/w % d.s.) | 0.74 kg | 0.74 kg | 0.69 kg |
| Phosphoric acid (85 w/w % d.s.) | 13 g | 6 g | 6 g |
| Absolute pressure (hPa) | 200 | 220 | 240 |
| Agitator speed (rpm) | 30 | 30 | 30 |
| Reactor temperature (° C.) | 182 | 182 | 190 |
| Reaction time (minutes) | 30 | 30 | 30 |

In table 2, an overview is provided of the product characteristics including data on the reaction product composition, reducing sugar content, weight average molecular weight ($M_w$) and colour after reaction and before refining. In a comparative example, a polydextrose was prepared according to the process disclosed in U.S. Pat. No. 5,015,000. The product composition of the polydextrose according to U.S. Pat. No. 5,015,000, weight average molecular weight $M_w$ and colour after reaction and before refining, is also added to this table 2.

The weight average molecular weight is determined by means of GPC (Gel Permeation Chromatography) analysis of syrups and maltodextrins. The principle of this determination method is that the column is packed with a packing material of narrow particle size distribution and controlled pore size. The separation mechanism is based on the ability of the different sized molecules to diffuse in and out the porous structure. For each packing material there is a critical molecular size above which molecules are unable to enter the porous structure=exclusion limit. There is also a critical molecular size below which the packing material is unable to discriminate between molecules of different sizes=total permeation limit. Between these 2 limits, there is a region of selective permeation. The residence time of a molecule in the column is related to molecular size. The larger the molecules, the shorter the residence time within the pores, the faster they elute.

The product composition is determined via a HPLC-method. For the quantitative determination of saccharides, a cation exchange column is used. The different sugars are separated by molecular exclusion and ligand exchange. The sugars are detected using a differential refractometer. The sugars are eluting as following: higher sugars-trisaccharides-disaccharides-dextrose-fructose. The different disaccharides are not separated.

The colour of the composition is determined by the ICUMSA method. The principle of that method is when white light passes through a coloured solution, certain bands of the spectrum are absorbed allowing the transmitted portion to import the visual effect of colour. The intensity of the transmitted light can be measured by means of a spectrophotometer. The colour is expressed as ICUMSA Units.

The content of reducing sugars in the composition is determined by the titrimetrical Luff Schoorl-method. The method is based on the reduction of copper(II)-ions in alkaline solution by the reducing sugars and the additional back-titration of the remaining copper(II)-ions.

TABLE 2

Product characteristics batch (discontinuous) process

| Reaction product composition (w/w %) | Comp. Example | Example 1 | Example 2 | Example 3 |
|---|---|---|---|---|
| Dextrose | 3.5 | 1.5 | 2.2 | 1.9 |
| Sorbitol | 1.9 | 1.2 | 1.4 | 1.2 |
| DP 2 | 10.6 | 7.2 | 7.9 | 7.4 |
| DP 3 | 10.3 | 7.0 | 7.9 | 6.7 |
| >DP 3 | 71.1 | 82.3 | 79.8 | 81.9 |
| $M_w$ | 1158 | 1582 | 1426 | 1659 |
| Reducing sugar content (w/w % d.s.) | 6.4 | 3.2 | 4.2 | 2.7 |
| Colour (ICUMSA-units) | 1230 | 1004 | 588 | 1796 |
| Product temperature (° C.) | 180 | 170 | 160 | 180 |

This table clearly illustrates advantageous characteristics such as reduced colour, lower reducing sugars in combination with a higher weight average molecular weight ($M_w$). Also a remarkable difference in >DP 3 is observed. It also shows that increased temperature increases >DP 3 and $M_w$ but also colour. Thus lower reaction temperatures and/or shorter reaction times will be advantageous.

EXAMPLES 4-7

In a second series of examples polycondensation products are prepared in a continuous mode using a DTB 16 CONTI blender with an ADS 25 discharger, both from LIST AG. The fed ingredients solution is prepared separately as a pre-blend in an agitated and heated vessel. The mixture is stirred and heated at 110° C. providing a medium viscous liquid at that temperature. This mixture is then fed into the continuous reactor.

Reaction conditions during the continuous process are given in table 3.

TABLE 3

Reaction parameters

|  | Example 4 | Example 5 | Example 6 | Example 7 |
|---|---|---|---|---|
| Dextrose monohydrate | 100 kg | 10 kg | 100 kg | 70 kg |
| Sorbitol syrup (70 w/w % d.s.) | 14.3 kg | 14.3 kg | 14.3 kg | 10 kg |
| Phosphoric acid (85 w/w % d.s.) | 0.25 kg | 0.25 kg | 0.25 kg | 0.18 kg |
| Water | 0 | 0 | 0 | 3.17 kg |
| Total moisture content (w/w %) | 11.7 | 11.7 | 11.7 | 15.03 |
| Feed rate (kg/h) | 18.7 | 18.7 | 22.8 | 16.0 |
| Feed temperature (° C.) | 110 | 110 | 110 | 110 |
| Reactor temperature (° C.) | 190 | 200 | 200 | 200 |
| Absolute pressure (hPa) | 100 | 100 | 100 | 250 |
| Agitator speed (rpm) | 30 | 30 | 30 | 20 |
| Filling level (%) | 70-80 | 70-80 | 75-85 | 40-50 |

In example 5, the reactor temperature was increased from 190° C. to 200° C. without modifying throughput. In example 6 temperature was kept at 200° C. while throughput was increased to 22.8 kg/h. As shown in table 3 and table 4, this has a clear impact on product outlet temperature, and product characteristics. The residence time in the continuous reactor was between 35 and 40 minutes. The product characteristics of the polycondensates obtained in examples 4 to 7 are listed in table 4 and compared with the comparative example product.

TABLE 4

Product characteristics continuous process

| Product composition | Comp. Ex. | Example 4 | Example 5 | Example 6 | Example 7 |
|---|---|---|---|---|---|
| Dextrose | 3.5 | 0.6 | 0.5 | 0.6 | 0.7 |
| Sorbitol | 1.9 | 1.2 | 1.2 | 1.2 | 1.1 |
| DP 2 | 10.6 | 5.4 | 5.2 | 5.5 | 5.4 |
| DP 3 | 10.3 | 6.3 | 5.9 | 6.5 | 6. |
| >DP 3 | 71.1 | 83.3 | 83.6 | 83.1 | 83.2 |
| $M_w$ | 1230 | 1907 | 1845 | 1682 | 1790 |
| Reducing sugars (w/w % d.s.) | 6.4 | 1.8 | 1.2 | 1.6 | 1.9 |
| Colour (ICUMSA-units) | 1230 | 980 | 2897 | 1272 | 1077 |
| Product exit temp. (° C.) | 180 | 175 | 186 | 179 | 178 |

The results from the continuous process clearly show low reducing sugar contents and high molecular weight, compared to the state of the art product from the comparative example. For higher molecular weights, comparable to lower colour values were realised, with the exception of example 5. In this case the exit product temperature is clearly higher. Increasing throughput at that temperature resulted in improved colour.

The invention claimed is:

1. A process for preparing a randomly-bonded polysaccharide, wherein the randomly-bonded polysaccharide is produced from ingredients comprising a monosaccharide, a polyol and an acid catalyst, wherein the process is performed in a mixing kneader device having counter-acting blades, wherein said mixing kneader device is heated to a temperature of between 160° C. and 220° C. at a reduced pressure of between 50-400 hPa, wherein the process comprises the steps of
   a: simultaneously or consecutively feeding the ingredients into said mixing kneader device, wherein a total moisture content of the fed ingredients in the mixing kneader device is between 10 and 30 w/w %;
   b: kneading and mixing the fed ingredients in said mixing kneader device in order to remove water through which the fed ingredients are dehydrated to an anhydrous syrup; and
   c: polycondensating the anhydrous syrup by continuously kneading it in the said mixing kneader device in order to remove water until a required degree of polymerisation (DP) is obtained, wherein the DP of over 3 is equal to or higher than 80% by weight.

2. The process according to claim 1, wherein the mixing kneader device is heated between 175° C. and 200° C.

3. The process according to claim 2, wherein the mixing kneader device is heated between 175° C. and 190° C.

4. The process according to claim 1, wherein the reduced pressure in the mixing kneader device varies between 10 and 300 hPa.

5. The process according to claim 1, wherein the mixing kneader device is filled up to a filling level of between 40 and 90%.

6. The process according to claim 5, wherein the mixing kneader device is filled up to a filling level of between 75 and 85%.

7. The process according to claim 1, wherein an amount of water is added in order to homogenise the ingredients in the mixing kneader devices.

8. The process according to claim 1, wherein the ingredients are fed to the mixing kneader device as a pre-blend.

9. The process according to claim 1, wherein the total moisture content of the fed ingredients as present in the mixing kneader device is between 11 and 20 w/w %.

10. The process according to claim 1, wherein the polyol is a sorbitol.

11. The process according to claim 10, wherein the sorbitol is selected from the group consisting of crystalline sorbitol, crystallising sorbitol syrup and non-crystallising sorbitol syrup.

12. The process according to claim 11, wherein the sorbitol is a crystallising-type sorbitol syrup.

13. The process according to claim 1, wherein the saccharide is a glucose.

14. The process according to claim 13, wherein the glucose is selected from the group consisting of crystalline dextrose monohydrate, anhydrous dextrose, D99 dextrose syrup, and D6 glucose syrup.

15. The process according to claim 14, wherein the glucose is a crystalline dextrose monohydrate.

16. The process according to claim 1, wherein the acid serving as a catalyst is an organic acid.

17. The process according to claim 16, wherein the organic acid is citric acid, tartaric acid, succinic acid and/or fumaric acid.

18. The process according to claim 1, wherein the acid serving as a catalyst is an inorganic acid.

19. The process according to claim 18, wherein the inorganic acid is phosphoric acid.

20. The process according to claim 16, wherein for using the randomly-bonded polysaccharides in food-applications, the acids used are food grade.

21. The process according to claim 1, wherein the process is performed continuously.

22. The process according to claim 1, wherein the process is performed in batch.

* * * * *